United States Patent
Fang et al.

(10) Patent No.: US 12,402,232 B2
(45) Date of Patent: Aug. 26, 2025

(54) SPLICING LAMP, DETECTION EXECUTING METHOD, AND DETECTION DRIVING METHOD

(71) Applicant: Shenzhen Intellirocks Tech. Co., Ltd., Shenzhen (CN)

(72) Inventors: Nan Fang, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 0 days.

(21) Appl. No.: 18/984,779

(22) Filed: Dec. 17, 2024

(65) Prior Publication Data
US 2025/0203742 A1    Jun. 19, 2025

(30) Foreign Application Priority Data
Dec. 18, 2023 (CN) .......................... 202311741622.5

(51) Int. Cl.
*H05B 47/175* (2020.01)
*F21S 2/00* (2016.01)
*F21Y 105/00* (2016.01)
*H05B 47/14* (2020.01)
*H05B 47/155* (2020.01)

(52) U.S. Cl.
CPC .......... *H05B 47/1995* (2024.01); *F21S 2/005* (2013.01); *H05B 47/14* (2020.01); *H05B 47/155* (2020.01); *F21Y 2105/00* (2013.01)

(58) Field of Classification Search
CPC .. H05B 47/1995; H05B 47/14; H05B 47/155; F21S 2/005; F21Y 2105/00
See application file for complete search history.

(56) References Cited

U.S. PATENT DOCUMENTS

| 7,508,141 | B2 * | 3/2009 | Wong | ................. | H05B 47/155 |
| | | | | | 315/185 S |
| 2011/0025214 | A1 * | 2/2011 | Lin | ....................... | H05B 47/18 |
| | | | | | 315/185 R |

* cited by examiner

*Primary Examiner* — Daniel D Chang
(74) *Attorney, Agent, or Firm* — Wenye Tan (57) ABSTRACT

A detection executing method comprises: a current control chip initially configuring all ports in a strong pull-down mode, so as to initiate detection procedures as follows; the current control chip detecting a level status of each port thereof, and when detecting a port with a high level status, identifying the port as an upstream port electrically connected with an upstream control chip in the communication link, and configuring other ports to be in a weak pull-up mode; the current control chip detecting the level status of each of the other ports, and when detecting a port with a low level status, identifying the port as a downstream port electrically connected with a downstream control chip in the communication link; the current control chip outputting a high level through the downstream port thereof, for driving the downstream control chip connected with the downstream port to execute the same detection procedures.

7 Claims, 3 Drawing Sheets

FIG. 1 a current control chip in a communication link configuring all ports thereof to be in a strong pull-down mode, so as to initiate detection procedures as follows — S5100 the current control chip detecting a level status of each port thereof, and when detecting a port with a high level status, identifying the port as an upstream port electrically connected with an upstream control chip in the communication link, and configuring other ports to be in a weak pull-up mode — S5200 the current control chip detecting the level status of each of the other ports, and when detecting a port with a low level status, identifying the port as a downstream port electrically connected with a downstream control chip in the communication link — S5300 the current control chip outputting a high level through the downstream port thereof, for driving the downstream control chip connected with the downstream port to execute the same detection procedures as the current control chip does — S5400

SPLICING LAMP, DETECTION EXECUTING METHOD, AND DETECTION DRIVING METHOD

CROSS-REFERENCES TO RELATED APPLICATIONS

This application claims priority to Chinese Patent Application No. CN202311741622.5, filed on Dec. 18, 2023, the content of which is hereby incorporated by reference in its entirety.

FIELD OF THE TECHNOLOGY

The present disclosure relates to the technical field of lighting technology and, specifically, to a splicing lamp, a detection executing method, and a detection driving method.

BACKGROUND OF THE DISCLOSURE

With such functions as presenting information and decorating atmosphere, splicing lamps have been widely used. The intelligent level thereof gets higher and higher, and the functions thereof are developed constantly to adapt to different needs.

A typical splicing lamp is made by splicing multiple lamp modules that are controlled by a controller. One of the traditional techniques for obtaining the connection relationship information is that based on serial communication protocols, an upper control chip sends an instruction through a port thereof to a port of a lower-level control chip and waits for a response from the lower-level port to confirm whether a lower-level device exists, or an upper-level control chip confirms whether a lower-level device exists through output at one port and input at the other port.

In the implementation manner of the traditional techniques, when it comes to confirming the existence of a lower-level device, it will inevitably take a relatively long time if it is necessary to wait for the response from the lower-level device, whereas there will be a sharp increase in the cost of chips if each control chip needs to realize the detection of the lower-level device by virtue of two ports. In addition, even if the detection of the connection relationship between two control chips is realized by switching between input and output status of a single port, once the corresponding ports of the two control chips are respectively at high and low levels, it is easy to generate relatively large current at the two ports, which may damage devices. In theory, the safety of the devices can be improved by limiting the current at the two ports, but it will increase the complexity of the detection, and cannot be implemented without the help of the external environment. When there are a relatively great number of devices in connection, a relatively great number of ports need to be detected, which can still end up with an overly low detection speed.

SUMMARY

Embodiments of the present disclosure provides a splicing lamp, a detection executing method, and a detection driving method as set forth in the appended set of claims.

According to one aspect of the present disclosure, a detection executing method is provided. The method includes: a current control chip in a communication link configuring all ports thereof to be in a strong pull-down mode, so as to initiate detection procedures as follows; the current control chip detecting a level status of each port thereof, and when detecting a port with a high level status, identifying the port as an upstream port electrically connected with an upstream control chip in the communication link, and configuring other ports to be in a weak pull-up mode; the current control chip detecting the level status of each of the other ports, and when detecting a port with a low level status, identifying the port as a downstream port electrically connected with a downstream control chip in the communication link; the current control chip outputting a high level through the downstream port thereof, for driving the downstream control chip connected with the downstream port to execute the same detection procedures as the current control chip does.

According to one aspect of the present application, a detection driving method is provided, which comprises: a control chip of a controller initiating a self-inspection mode and configuring all ports thereof to be in a weak pull-up mode; the control chip of the controller detecting a level status of each port, when detecting a port with a low level status, identifying the port as a downstream port electrically connected with a downstream control chip in a communication link; the control chip of the controller outputting a high level to the downstream port, so that the downstream control chip connected with the downstream port executes the detection procedures in the detection executing method.

According to another aspect of the present application, a splicing lamp is provided, which comprises a controller and at least one lamp module, wherein: the lamp module comprises a control chip and multiple light-emitting units controlled by the control chip, wherein the control chip is configured to serve as a current control chip and execute a detection executing method as mentioned above; and the lamp module is in communication connection with the controller through the same communication link.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

A typical splicing lamp is made by splicing multiple lamp modules that are controlled by a controller. In general, each lamp module has multiple light-emitting units that can independently control corresponding lamp beads to emit light. Both the controller and the lamp modules have control chips. When a lamp module is connected with a controller or a lamp module is connected with another lamp module, the controller needs to obtain connection relationship information that is constituted by each lamp module in the entire lamp; as such, the control chip of each lamp module identifies connection information of each port of its own and reports the connection information to the controller, so that the controller determines the connection relationship information of the entire lamp according to the connection information of each lamp module.

Figure 1:
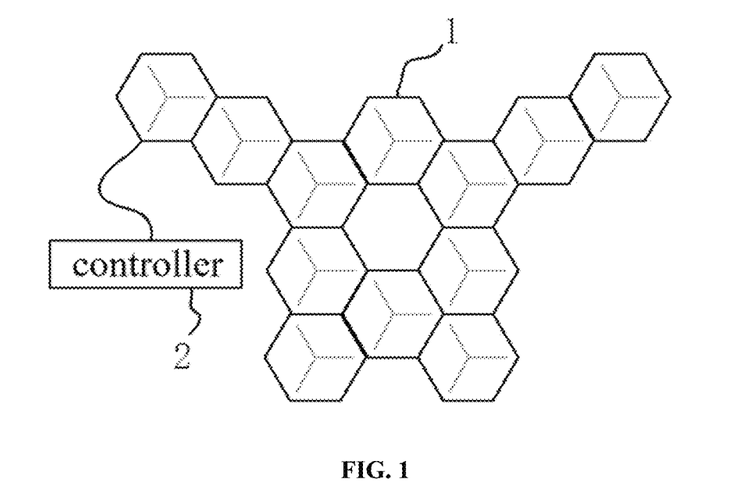
FIG. 1 is an electrical structure diagram of a splicing lamp in an embodiment of the present application.

As shown in FIG. 1, the splicing lamp exemplarily provided in the present application has an area array that is formed by splicing multiple lamp modules adjacent to each other. The entire area array is electrically connected with a controller of the splicing lamp. The controller takes centralized control of the entire area array to play lamp effects. Therefore, the controller is responsible for the power control of each lamp module in the entire area array, the instruction control of each lamp module, and the data transmission of each lamp module. There are various product forms of lamp modules. According to the characteristics of both the forms of the lamp modules and the splicing relationship thereof, a variety of different forms of lamp modules can be spliced to obtain a single splicing lamp. The optional forms include any polygonal shapes, such as triangles, quadrilaterals, pentagons, and hexagons, or radial shapes composed of any number of lines, etc. These shapes are suitable for adjacent splicing on the same plane to form a certain layout shape. The splicing lamp in the present application can be used as an ambient lamp, which can achieve an effect of decorating the space atmosphere. Moreover, through the light emission of the area array, patterns or words can be formed on the splicing lamp to convey information. Of course, with the function of certain illumination, the splicing lamp are often mounted in indoor spaces.

The lamp module in the present disclosure can comprise multiple light-emitting units, and each light-emitting unit can be provided with a corresponding light emission control chip, for parsing corresponding control data to generate a corresponding light emission control signal. Through the light emission control signal, a light-emitting component in a corresponding light-emitting unit can be controlled to emit light according to specific light emission parameters. As a whole, the lamp module can be provided with one independent control chip as a control unit to control the light emission of all the light-emitting units therein. The independent control unit can transmit corresponding lamp effect control data to the light emission control chip of each light-emitting unit to achieve the purpose of centralized control. Of course, the entire lamp module can also have individual control chips that directly control each light-emitting unit to achieve the purpose of playing corresponding lamp effects. This is flexibly designed according to the capabilities of the lamp module and the control chips used in the light-emitting units thereof, and does not affect the manifestation of the creative spirit of the present application. As can be learned from these principles, for one lamp module, it is feasible to not only control all the light-emitting units thereof to emit light at the same time, but apply the control granularity to each light-emitting unit. The finer the control granularity, the finer the generated lamp effect.

The multiple light-emitting units in the lamp module can be divided into areas and subjected to centralized management according to positions thereof on the display surface of the lamp module, so as to define multiple light-emitting areas. Generally speaking, the types of the light-emitting areas in the lamp module can be a linear structural edge and/or a planar regular region. For example, in one embodiment, a radial lamp module is formed by connecting three structural edges at the same end to form a Y shape, and the three structural edges constitute three light-emitting areas of the lamp module. In another embodiment, a quadrilateral lamp module is equally divided into four regular regions to form four light-emitting areas. In another embodiment, which is in a more comprehensive case, a hexagonal lamp module is divided into three diamond-shaped regular regions, i.e., diamond-shaped blocks, and structural edges that surround the three diamond-shaped blocks; each diamond-shaped block has three structural edges, respectively; as a result, from the overall perspective of the entire lamp module, the lamp module has six structural edges on the periphery and three roughly Y-shaped structural edges that separate the three diamond-shaped blocks; as such, each diamond-shaped block and each structural edge are separate light-emitting areas. In the distribution situations of various light-emitting areas in the above examples, one or more light-emitting units are arranged in each light-emitting area, and the light-emitting area and the light-emitting units arranged therein can be determined thereby; subsequently, each light-emitting unit can be under centralized control on the basis of the light-emitting area as a unit.

Lamp modules 1 in different lamp module forms can be spliced with each other. For example, a quadrilateral lamp module adjoins any structural edge on the periphery of a hexagonal lamp module. It is not difficult to understand that, by matching lamp modules in different lamp module forms, more area array patterns can be constructed.

To facilitate connection with other lamp modules 1, each lamp module 1 is provided with corresponding connection interfaces at structural edges presented by the geometric shape thereof. These connection interfaces include electrical interfaces. Alternatively, a mounting interface can be further arranged, or a mounting interface and an electrical interface can be combined into a single electromechanical interface. A user can assemble a splicing lamp in a corresponding area array pattern by splicing different lamp modules 1 in succession to form a desired topological effect. By splicing according to different adjoining relationships, different area array patterns can be assembled naturally. The electrical interface is mainly used to transmit power, data, and instructions among others. The control unit that plays a role of centralized control in the lamp module, as one port of the control chip thereof corresponds to one structural edge, can determine whether there is a connection relationship between structural edges by detecting the input/output state of ports corresponding to the structural edges in the lamp module, identify the structural edge connected with other lamp modules as a connected edge, and identify the structural edge that is not connected with the other lamp modules as an unconnected edge. For the connected edge, the connection interface thereof is an output or input interface of one light-emitting unit in the structural edge in essence. Therefore, by detecting the connection state of each light-emitting unit, it can be determined whether the lamp module is connected with the other lamp modules.

Each lamp module in the splicing lamp can establish communication connection with the controller by complying with the same data communication protocol. The controller implements functions thereof through the control chip. The controller is generally connected with one or more first lamp modules through one port that corresponds to the control chip thereof. Then, other lamp modules are connected with previously connected lamp modules in succession. The same lamp module can be connected with multiple other lamp modules through multiple structural edges thereof to expand multiple branches. By analogy, it is not difficult to understand that the connection relationship of the entire area array can constitute a tree-like connection topology. Those which begin with the first lamp module starting from the controller and serving as the root node in the tree topology, and reach each leaf end node in the tree topology can be regarded as the same branch chain. In fact, each branch chain constitutes a communication link. By arranging multiple ports, the control chip of the controller can support the construction of multiple branch chains of this kind according to needs. Instructions and data sent by the controller can reach the control unit of each lamp module along the branch chain. Conversely, each lamp module can upload data and instructions of its own to the controller along the branch chain. Generally speaking, lamp modules in each branch chain process instructions and data that correspond thereto according to standardized data communication protocols, while performing functions of uploading and sending down to other upper-level and lower-level lamp modules through the branch chain. It is not difficult to understand that the connection position of a corresponding lamp module is first determined by identifying the connected edge and the unconnected edge of each lamp module in the same branch chain, and the ordinal position of the lamp module in the entire branch chain is then determined by combining the hierarchical order of the lamp module in the entire branch chain, so that the area array pattern of the entire branch chain can be identified, and the splicing shape of the entire branch chain is described accordingly. By analogy, when there are multiple branch chains, the area array patterns of the multiple branch chains constitute the entire area array pattern of the entire splicing lamp, which corresponds to the splicing shape of the entire splicing lamp.

For example, FIG. 1 shows a splicing lamp formed by splicing multiple lamp modules 1 in a regular hexagonal structure, wherein each lamp module 1 comprises multiple light-emitting units, which are distributed in each diamond-shaped block and each structural edge in a regular hexagonal structure, and/or structural edges between the diamond-shaped blocks. As such, each lamp module 1 can be subjected to light emission control with different granularity. For example, each diamond-shaped area, each structural edge, or individual light-emitting units therein can be controlled separately, or all the light-emitting units in the lamp module 1 can be controlled as a whole.

The controller 2 in the splicing lamp generally comprises a control chip and a communication component among others, serves to realize the operation control of the entire splicing lamp, and is responsible for the communication inside and outside the entire splicing lamp, such as collecting the connection information of each lamp module, transmitting the lamp effect control data to each lamp module, and executing data communication with an external device with respect to functions such as mounting, detecting, and playing lamp effects. The external device in communication with the controller can be terminal devices in any form, in which device corresponding application programs are installed and running, such as mobile phones, tablet computers, personal computers, and remote controls, and the application programs installed and running therein are suitable for communicating with the controller to realize various functions. The controller can generate topological data of the entire area array according to the connection information of each lamp module, and describe the connection relationship information of each lamp module in the entire array through the topological data, so as to facilitate the construction of corresponding lamp effect control data according to the connection relationship information.

The control chip in the controller, the control chip that plays a role of uniform control in the control unit of the lamp module, the control chip used by each light-emitting unit in the lamp module among others can be implemented by using various kinds of embedded chips, such as Bluetooth SoC (System on Chip) and WiFi SoC, which have built-in communication components, and MCU (Micro Controller Unit) and DSP (Digital Signal Processing), which are additionally configured with communication components. The control chip generally comprises a central processing unit and a memory, and mainly serves to store and execute program instructions to achieve corresponding functions. A communication component can be used for wireless or wire communication with an external device. For example, the control chip in the controller can communicate with various kinds of smart terminal devices, such as personal computers and smart phones, to facilitate the user transmitting lamp effect description information to the splicing lamp through the terminal device for generating lamp effect control data that correspond to lamp effects and transmitting the lamp effect control data to each lamp module in the splicing lamp.

After the control chip receives the lamp effect description information through the communication component, the lamp effect description information can be parsed into the lamp effect control data for controlling each lamp module and even each light-emitting unit in the splicing lamp, and the lamp effect control data are output to each lamp module 1, so as to control the corresponding light-emitting units in each lamp module 1 to play lamp effects in coordination.

In some embodiments, the controller 2 can also be equipped with a power adapter, a control panel, and a display screen among other according to needs. The power adapter is mainly used to convert the electric supply into direct current to facilitate powering the entire splicing lamp. The control panel usually provides one or more buttons for implementing switch control of the controller 2. The display screen can be used to display various kinds of control information, so as to facilitate cooperating with the buttons in the control panel to support the implementation of human-computer interaction functions. In some embodiments, the control panel and the display screen can be integrated into the same touch display screen.

The control chip used in the present application can be equipped in the controller and each lamp module, and generally has one or more ports. The control chip can adjust the operating mode of a certain port thereof through one internal configuration module, so that the port works in different states accordingly.

An exemplary control chip is a microcontroller, which has a port with input and output functions. The microcontroller can select the corresponding input and output states of the port according to different applications. For a port in the input state to be read, the microcontroller first arranges the port to perform an input function, i.e., the port is used as an input port to receive input signals. The microcontroller carries out mode configuration of the internal configuration module through an internal register. The internal configuration module can be configured to be in a pull-down mode or a pull-up mode according to whether the resistor in an external voltage-dividing module connected with the input port is an external pull-up resistor or an external pull-down resistor. For example, it can be configured to be in a strong pull-up mode, a strong pull-down mode, a weak pull-up mode, and a weak pull-down mode. As can be seen, the internal configuration module of the microcontroller also performs the voltage-dividing function in essence, and is equivalent to a voltage-dividing module. As such, when two microcontrollers each are connected through one port, the internal configuration module on one of them can become an external voltage-dividing module of the other. For each microcontroller, the voltage-dividing function of a port of a microcontroller connected with the port of its own can be regarded as an external voltage-dividing module, and the detection and setting of the connection relationship between two ports connected with each other can be realized through the collaborative configuration of two microcontrollers.

For a port considered as an input port in one microcontroller, the external voltage-dividing module thereof can operate in the pull-up mode or the pull-down mode, which is equivalent to being implemented as an external pull-up resistor or an external pull-down resistor. When the external voltage-dividing module is implemented as an external pull-up resistor, one end of the external pull-up resistor is connected with the power supply of the microcontroller, and the other end of the external pull-up resistor is connected with the input port. When the external voltage-dividing module is implemented as an external pull-down resistor, one end of the external pull-down resistor is connected with the input port, and the other end of the external pull-down resistor is grounded. According to different configuration modes, the pull-up or pull-down function is different, and the corresponding resistance value is also different. As such, the external pull-up resistor can also be divided into an external strong pull-up resistor and an external weak pull-up resistor, so as to correspond to the strong pull-up mode and the weak pull-up mode, respectively. The external pull-down resistor can also be divided into an external strong pull-down resistor and an external weak pull-down resistor, so as to correspond to the strong pull-down mode and the weak pull-down mode, respectively. When the connection position and value of the resistor in the external voltage-dividing module connected with the input port are different, the corresponding input state will also be different. Therefore, by judging differences in the connection position and value of the resistor in the external voltage-dividing module connected with the input port, different input states can be identified.

According to differences in the connection position and value of the resistor in the external voltage-dividing module, the initial input state of the input port will also be different. Therefore, when detecting the port, it is necessary to first detect the high or low level status of the input port to be read, so as to obtain the initial level status of the input port.

The connection position of the resistor in the external voltage-dividing module is judged according to the initial level status of the obtained input port. When the initial level status is a high level status, it is judged that the resistor in the external voltage-dividing module connected with the input port is an external pull-up resistor, and it can be learned that the port connected with the input port is in a pull-up mode accordingly. When the initial level status is a low level status, it is judged that the resistor in the external voltage-dividing module connected with the input port is an external pull-down resistor, and it can be learned that the port connected with the input port is in a pull-down mode accordingly. Therefore, according to the initial level status of the obtained input port, it can be judged whether the port connected with the input port is in the pull-up mode or the pull-down mode, so that the mode configuration of the internal configuration module of the microcontroller can be carried out according to actual needs. Further, it is not difficult to understand that whether the port connected with the input port is in the strong or weak pull-up mode or in the strong or weak pull-down mode is determined according to the level status by using differences in the strong pull-down or pull-up effects and the weak pull-down or pull-up effects, changing the operating mode of the input port, and then detecting the level status at the input port.

In the splicing lamp of the present application, the controller and each lamp module that is connected with the communication link can use the microcontroller described in the above exemplary illustration. The purpose of detecting the connection relationship information in the communication link of the splicing lamp can be achieved by using the feature that the microcontroller can be configured to have multiple voltage-dividing operating modes.

Figure 2:
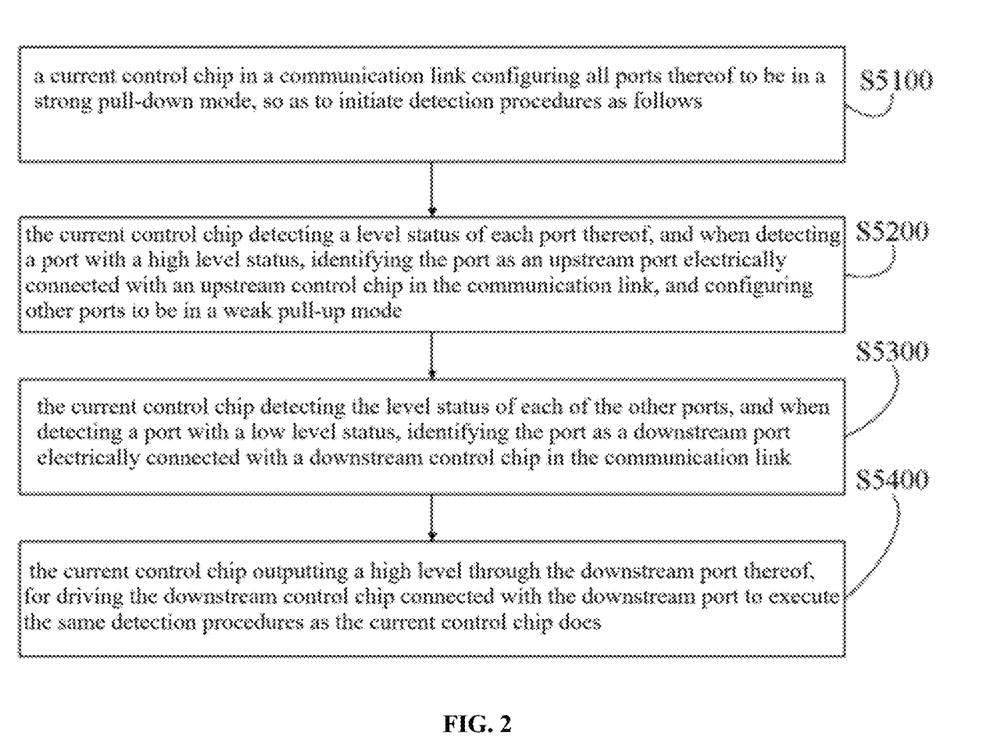
FIG. 2 is a flow diagram of a detection executing method in an embodiment of the present application.

The detection executing method in the present application can be implemented as a computer program product, which is loaded into the control chip of the lamp module to run. As shown in FIG. 2, in one embodiment, the detection executing method in the present application comprises:

step S5100: a current control chip in a communication link configuring all ports thereof to be in a strong pull-down mode, so as to initiate detection procedures as follows;

Taking a splicing lamp for example, starting from one port of a control chip of a controller thereof, a user can connect the first lamp module, so that one port of the control chip in the first lamp module is connected with the port of the controller. Then, based on the first lamp module, corresponding structural edges can be further selected to splice subsequent lamp modules. Two adjacent lamp modules are connected with each other through one port of the control chip on each of them, so as to form the communication link mentioned in the previous text.

Taking any lamp module in the communication link for example, for the convenience of understanding, it is referred to as a current lamp module, and the built-in control chip thereof is referred to as a current control chip. In the same communication link, the lamp module connected with the current lamp module and closer to the control chip of the controller than the current lamp module is referred to as an upstream lamp module of the current lamp module. Conversely, the lamp module connected with the current lamp module and farther from the control chip of the controller than the current lamp module is referred to as a downstream lamp module. Correspondingly, the control chip of the upstream lamp module is an upstream control chip, and the control chip of the downstream lamp module is a downstream control chip.

In the present application, since the control chips of the lamp modules are written into computer programs corresponding to the same business logic, they execute the exactly same business procedures when they are powered on to operate. In this standardized manner, the implementation cost of establishing a communication link with lamp modules can be reduced, and detection efficiency can be improved.

When the lamp module is powered on or responds to external detection instructions, according to the default business logic thereof, each port of the current control chip is initialized through the internal configuration module in the current control chip, and each port of the control chip is configured to be in a strong pull-down mode. The current port in the strong pull-down mode has a tendency to lower the level. When the corresponding port of the external control chip connected with the current port is in a weak pull-up mode, since the strong pull-down effect is greater than the weak pull-up effect, it inevitably causes the external control chip to detect a low level at the corresponding port. Therefore, the current control chip configures the current port to be in the strong pull-down mode, which is equivalent to sending a notification that the corresponding port has a downstream control chip to the ports of other external control chips connected with the current port.

After the current port is configured to be in the strong pull-down mode, subsequent steps can be executed to initiate the detection procedures, and detect the input/output state of each port, so as to confirm the upstream and downstream connection relationship of the current control chip.

step S5200: the current control chip detecting a level status of each port thereof, and when detecting a port with a high level status, identifying the port as an upstream port electrically connected with an upstream control chip in the communication link, and configuring other ports to be in a weak pull-up mode;

When the current control chip executes the detection procedures thereof, it polls each port to detect the level status of each port. When it is detected that the level status of a certain current port is a high level in the polling process, it indicates that a high level signal has been input thereto from the outside. In this case, the current port can be identified as a port with an external connection relationship, which usually means that the current port has established a connection relationship with a certain port in a control chip of a lamp module or a controller located upstream of the communication link. Therefore, the current port can be identified as an upstream port, which is equivalent to identifying the input/output state of the current port as an input state, with the function of inputting instructions, data, and signals.

In some embodiments, the high level of the current port as detected by the current control chip can be driven as the corresponding port of the upstream control chip thereof outputs a high level signal, and is usually driven by sending the high level signal after the upstream control chip detects that the corresponding port thereof is in the low level status. Therefore, by detecting the level of the current port, it can be detected that the current port is in a high level status, which can confirm that the current port is an upstream port.

After the current control chip identifies the current port as an upstream port, other ports than the upstream port can be configured to be in a weak pull-up mode through the internal configuration module, so as to intercept in the weak pull-up mode whether a port of a downstream control chip in the strong pull-down mode is connected therewith. If one of the other ports is just connected with the corresponding port of one downstream control chip at this moment and the downstream control chip has initialized the configuration that all ports of the current control chip are in the strong pull-down mode according to the business logic of the current control chip, then a low level will be detected at said one of the other ports since the strong pull-down effect is greater than the weak pull-up effect.

step S5300: the current control chip detecting the level status of each of the other ports, and when detecting a port with a low level status, identifying the port as a downstream port electrically connected with a downstream control chip in the communication link;

After the current control chip configures each of the other ports thereof to be in the weak pull-up mode, the level status of each of the other ports can be polled and detected. When a port in a low level status, i.e., a low level port, is detected, it indicates that the connection relationship with a corresponding port of one downstream control chip has been established at the low level port. Therefore, the low level port can be identified as a downstream port in the current control chip, which is equivalent to identifying the input/output state of the low level port as an output state. It is not difficult to understand that the low level port has already been configured to be in the weak pull-up mode through the internal configuration mode beforehand, and the corresponding port in the downstream control chip is initialized to be in the strong pull-down mode according to the business procedures in the present method. Since the voltage-reducing effect of the strong pull-down mode is greater than the voltage-boosting effect of the weak pull-up mode, a low level can naturally be detected at the low level port of the current control chip.

The current control chip polls and detects each of the other ports to identify one or more low level ports therefrom. Multiple low level ports are allowed to exist simultaneously in support of splicing a single lamp module with multiple downstream lamp modules. In other words, the current control chip of the current lamp module is allowed to be connected with corresponding ports in control chips of multiple downstream lamp modules through multiple ports, so as to support the implementation of the branch chain topology by each lamp module in the splicing lamp of the present application.

step S5400: the current control chip outputting a high level through the downstream port thereof, for driving the downstream control chip connected with the downstream port to execute the same detection procedures as the current control chip does;

After the current control chip identifies each downstream port thereof, high level signals can be output through each downstream port thereof according to the same business logic as in the case of the current control chip per se. Under the action of the high-level signals, it will be detected that a corresponding port of a downstream control chip connected with the downstream port is in a high level status under the circumstances that the corresponding port has been initially configured to be in the strong pull-down mode beforehand. Therefore, the same detection procedures, i.e., the process from step S5200 to step S5400 as executed by the current control chip in the present application, can be executed as the current control chip does.

As can be seen, by outputting a high level through the downstream port thereof, the current control chip can perform the function of driving the downstream control chip connected with the downstream port to execute the same detection procedures as the current control chip does. The principle thereof is the same as that in the response process that the current control chip detects a high level at the upstream port thereof. As such, the control chip of each lamp module connected with the communication link iteratively executes the detection procedures of detecting the input/output state of each port of its own in sequence. Without interaction between the upstream and downstream control chips, the detection procedures of its own can be completed, which is more efficient.

As can be learned from the above embodiments, the present application has multiple technical advantages, which include, but are not limited to, the following aspects:

the present application first initializes the configuration that all ports of the current control chip are in a strong pull-down mode, so as to initiate detection procedures; in the detection procedures, there is a trend of lowering the level at each port connected with a port of another control chip, so as to notify said another control chip of the existence of a lower level connection relationship; after said another control chip confirms the lower-level connection relationship and outputs a high level, the current control chip can detect the high level at the corresponding port, thereby confirming that the port is an upstream port; then, the current control chip configures other ports to be in a weak pull-up mode, so that they have the capability of intercepting the connection relationship of ports of external control chips in the strong pull-down mode; when the ports of other control chips lower the level of the corresponding port of the current control chip through the strong pull-down mode and the current control chip detects a low level at the port, it can be confirmed that the port is a downstream port; after the downstream port is identified, a high level is output through the downstream port to drive a downstream control chip to carry on the detection procedures; as such, just by switching modes, the current control chip can confirm upstream and downstream control chips that have connection relationships therewith, iteratively drive each control chip in the communication link to determine the connection information of its own, and finally obtain the connection relationship information of the entire communication link; there is no need for special interaction between adjacent control chips, nor is there a need to implement the detection of the connection relationship through two ports, not to mention the situation of excessive current; the implementation cost is low, and the detection speed is high;

with lamp modules that can be implemented with the control chip, the splicing lamp inherits various technical advantages of the control chip; further, the control chip of the controller in the splicing lamp can adapt to the technical features of the control chips of the lamp modules; by configuring each port of the control chip of its own to be in a weak pull-up mode, the first lamp module in the communication link can be driven to execute detection procedures; thus, each lamp module follows the same business logic, and successively executes the same detection procedures; ultimately, the controller obtains the connection relationship information in the entire communication link; as can be seen, the splicing lamp implemented in this way can safely and quickly determine the connection relationship information of each lamp module at a relatively low implementation cost.

On the basis of any embodiment of the detection executing method in the present application, steps after the current control chip outputs a high level through the downstream port thereof comprise:

step S6100: the current control chip intercepting and receiving a connection information packet through each downstream port thereof, and when the connection information packet is not received within a first duration, the current control chip encapsulating connection information of its own into a connection information packet and submitting the connection information packet through an upstream port thereof to an upstream control chip connected with the upstream port, wherein the connection information comprises an identity of each port of the control chip, to which it belongs, and input/output type thereof;

The control chip in the present application further implements the business logic of generating connection information corresponding to each port of its own and submitting the connection information step by step along the communication link. Specifically speaking, taking the current control chip for example, when the current control chip outputs a high level through the downstream port, it means that the current control chip per se has completed the detection of the input/output state of each port. In this case, the connection information corresponding to the input/output state of the port of its own can be determined to encapsulate the connection information into a connection information packet and submit the connection information packet step by step to the upstream through the upstream port thereof. At the same time, the current control chip further intercepts the connection information packet submitted by the downstream control chip through each downstream port thereof. After receiving the downstream connection information packet from the downstream port, the current control chip can add the connection information of its own to the same connection information packet to carry out transmission.

When the current control chip intercepts any downstream port, the interception is carried out within a first duration as set. If no connection information packet is received from the downstream port after the first duration expires, it can be determined that the current control chip is a node at the very end of the communication link. In this case, the connection information of its own is directly encapsulated as a connection information packet, and the connection information packet is submitted to the upstream control chip through the upstream port thereof.

The connection information of the current control chip can be encapsulated according to a preset protocol format. In an exemplary protocol format, the connection information comprises an identity of each port of the control chip, to which it belongs, i.e., the current control chip, and the input/output state thereof. Wherein, the input/output state can be represented by an identifier. For example, if the current control chip has six ports, the identities thereof are 1 to 6, where 1 is an upstream port, 5 and 6 are downstream ports, and the connection information can be represented in an exemplary way as follows:

1, in; 2, end; 3, end; 4, end; 5, out; 6, out wherein, in represents an upstream port, out represents a downstream port, and end represents an unconnected port. For the lamp module, end means that the corresponding structural edge is an unconnected edge, and in and out represent connected edges.

In one embodiment, for unconnected ports, they do not need to be represented. For example, the connection information as mentioned above can be further simplified as:

1, in; 5, out; 6, out

If none of ports of the current control chip includes a downstream port, it is only necessary to designate the upstream port thereof in the connection information. Further, the connection information is encapsulated into a connection information packet according to the preset protocol, and the connection information packet is submitted to the upstream control chip through the upstream port.

step S6200: when the current control chip receives a connection information packet submitted by a downstream control chip connected with a downstream port thereof through the downstream port within the first duration, the current control chip adding the connection information of its own to the connection information packet according to a sequential relationship thereof in the communication link, and submitting the connection information packet to the upstream control chip through the upstream port thereof.

If, through one or more of the downstream ports, the current control chip receives a connection information packet submitted by a downstream control chip connected with said one or more of the downstream ports within the first duration, the connection information packet can be updated by adding the connection information packet of the current control chip to the connection information packet, so that the connection information packet carries the connection information of each control chip below the current control chip. Since the connection information packet uses a preset data structure to represent the sequential relationship of the connection information of multiple control chips, it can be described briefly according to actual situations. Taking the connection information in the previous text for example again, suppose there are downstream control chips at ports 5 and 6 of the current control chip and both are end nodes, and the connection information of the two downstream control chips is represented as follows, respectively:

downstream control chip 1: 2, in
downstream control chip 2: 4, in

When the current control chip encapsulates the connection information packet, the connection information of its own can be added to the connection information packet submitted by the downstream control chip according to a certain sequential relationship. The connection information of the two downstream control chips in the above example is exactly embedded into corresponding positions in the connection information of the current control chip, which can be expressed as:

1, in; 5, out (2, in); 6, out (4, in)

Wherein, the connection information of downstream control chip 1 and downstream control chip 2 are embedded into the connection information of the current control chip, added after the identity of the port of the current control chip connected therewith, and distinguished by brackets. Taking this for example, it can be learned that the connection information packet represents the connection information of each port of each control chip according to the sequential relationship of each control chip in the communication link, and thus represents the connection relationship information between ports of each control chip in the entire communication link.

When each control chip in the communication link receives the connection information packet encapsulated and submitted by the downstream control chip through the downstream port thereof, the connection information of its own is added to the connection information packet, and the connection information packet is then submitted to the upstream control chip thereof through the upstream port thereof. In this way, the connection information packet is updated and submitted step by step. Finally, at a node on the top, which is generally the control chip of the controller, the connection information packet corresponding to the entire communication link can be received. After the control chip of the controller parses the connection information packet, the topological data corresponding to the entire communication link can be generated according to the connection information packet. Through the topological data, the connection relationship information of each control chip in the entire communication link can be grasped. According to the connection relationship information, the lamp effect description information can be converted into the corresponding lamp effect control data.

As can be learned from the above embodiments, the control chip in the present application encapsulates the connection information obtained by self-inspection into a connection information packet, and reports the connection information packet to the furthest upstream control chip according to a certain business logic, so that the furthest upstream control chip can generate the corresponding topological data according to the connection information packet, to serve for the generation of the lamp effect control data. Wherein, the control chip determines the submission timing and content of the connection information packet to the upstream control chip through the preset first duration, so as to realize automated data submission, which is more efficient.

Figure 3:
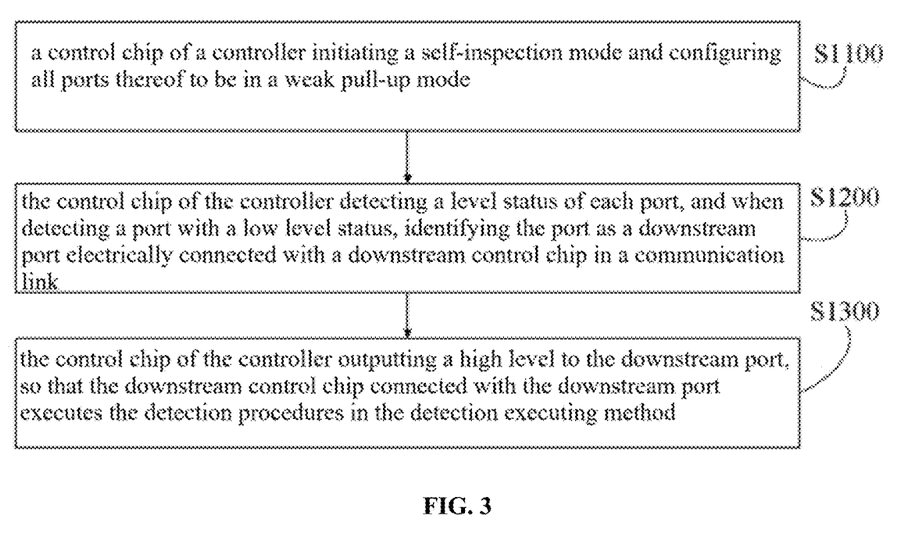
FIG. 3 is a flow diagram of a detection driving method in an embodiment of the present application.

The detection driving method in the present application can be implemented as a computer program product, which is loaded into the control chip of the controller to run. As shown in FIG. 3, in one embodiment, the detection driving method in the present application comprises:

step S1100: a control chip of a controller initiating a self-inspection mode and configuring all ports thereof to be in a weak pull-up mode;

The control chip in the controller of the splicing lamp is a node at the top end in the communication link of the splicing lamp. When the splicing lamp is powered on, the control chip of the controller can initiate the self-inspection mode according to the default business logic thereof or in response to external control instructions. In the self-inspection mode, the control chip of each lamp module in the entire communication link is driven to detect the connection information. Finally, the control chip of the controller obtains the connection information packet submitted by the control chip of each lamp module. As such, according to the business logic implemented by the control chip of the lamp module in the present application, the control chip of the controller can adapt to the business logic and implement the corresponding business logic, so as to achieve the above function. After the control chip of the controller initiates the self-inspection mode, each port thereof is configured to be in the weak pull-up mode according to the preset business logic.

step S1200: the control chip of the controller detecting a level status of each port, and when detecting a port with a low level status, identifying the port as a downstream port electrically connected with a downstream control chip in a communication link;

As can be learned by combining with the embodiments in the previous text, the upstream port of the first lamp module in one communication link will be connected with one port of the control chip of the controller as a designated port. At this moment, if the port of the control chip of the controller is configured to be in the weak pull-up mode, since the upstream port of the first lamp module is configured to be in the strong pull-down mode during initialization and the voltage-reducing effect of the strong pull-down of the upstream port is greater than the voltage-boosting effect of the weak pull-up of the designated port, the control chip of the controller will detect a low level status at the designated port in the process of polling and detecting each port. At this moment, the control chip of the controller can identify the designated port as a downstream port electrically connected with the downstream control chip in the communication link, thereby confirming that the designated port is connected with a lower-level device.

step S1300: the control chip of the controller outputting a high level to the downstream port, so that the downstream control chip connected with the downstream port executes the detection procedures in the detection executing method.

After the control chip of the controller confirms the downstream port, high level signals can be output to the outside through each downstream port according to the business logic corresponding to the control chip of the lamp module, so that the upstream port of the downstream control chip connected with the downstream port can initiate the detection procedures thereof according to the high level detected at the upstream port. As such, driven by the high-level signals transmitted by the control chip of the controller to the downstream port thereof, the control chip of each lamp module in the communication link initiates the detection procedures thereof in sequence to determine the connection information thereof. After the control chip of each lamp module responds one after another, the connection information of its own is encapsulated in a connection information packet, and the connection information packet is reversely submitted to the control chip of the controller step by step, so that the control chip can generate topological data that represent the connection relationship information of each lamp module according to the obtained connection information packet.

It should be pointed out that as the downstream control chip connected with the downstream port of the controller executes the detection executing method described in the previous text of the present application, the downstream control chip constitutes the current control chip in the executing process of the detection executing method, thereby determining the connection information of its own. For the same reason, the control chip of each lamp module in the entire communication link also serves as the current control chip in succession to execute the detection executing method described in the previous text of the present application, so as to determine the connection information of its own.

As can be learned from the above embodiments, the control chip of the controller only needs to cooperate with the first lamp module to complete the detection of the input/output state of the port connected therewith, then each lamp module in the entire communication link can be driven to carry out self-inspection of the connection information by transmitting the high level signals, without additional interaction. Driven by the controller, the detecting process of the connection relationship information in the area array composed of the lamp modules in the splicing lamp is efficient, fast and reliable. After generating the topological data from the obtained connection information packet, it can be ensured that the controller accurately shifts and plays the lamp effects.

On the basis of any embodiment of the detection driving method in the present application, steps after a control chip of a controller initiates a self-inspection mode, comprise:

step S2100: the control chip of the controller starting a timer and waiting within a second duration for a connection information packet, which includes connection information of each control chip arranged according to a sequential relationship in the communication link, wherein the connection information includes an identity of each port of the control chip, to which it belongs, and input/output type thereof;

After the control chip of the controller initiates the self-inspection mode thereof, it further starts a timer, which is responsible for calculating the set second duration. Within the time range limited by the second duration, the control chip waits for each downstream port of the control chip to receive the connection information packet submitted by the corresponding communication link.

The second duration set for the timer by the control chip of the controller is generally greater than the first duration taken by the control chip in the lamp module to wait for the downstream control chip to submit the connection information packet. In one embodiment, the second duration can be set by multiplying the number of lamp modules by a base value, which is preset as the time for a single lamp module to complete the detection procedures thereof. For the base value and the second duration, in addition that they are set according to the above principles, a margin can be appropriately expanded so that the control chip can wait for the connection information packet of each communication link within a reasonable time range, thereby ensuring smooth reception of the connection information packet.

Regarding the composition of the connection information packet and the composition of the connection information therein, they have been disclosed in the embodiments in the previous text, and will not be repeated herein.

step S2200: the control chip of the controller exiting the self-inspection mode and outputting alarm information when the connection information packet is still not received after the second duration expires.

If the control chip of the controller fails to receive the connection information packet of the corresponding communication link from a certain downstream port within the time range defined by the second duration, it can be considered as a self-inspection failure. As such, the control chip can exit the self-inspection mode while outputting alarm information, e.g., outputting an alarm notification to the display screen or outputting an alarm notification through other output devices.

As can be learned from the above embodiments, when the controller enters the self-inspection, a second duration is matched and set for controlling the self-inspection time, in hope of completing the self-inspection process of the connection relationship information of the entire splicing lamp within a reasonable time range. In the case of self-inspection timeout, the control chip of the controller can further output alarm information to effectively notify a user, so that the user can detect faults and restart the self-inspection in time, thereby ensuring that the user is guided to effectively organize each lamp module and finish forming the splicing lamp.

On the basis of any embodiment of the detection driving method in the present application, steps after the control chip of the controller starts a timer and waits within a second duration for a connection information packet comprises:

step S3100: the control chip of the controller receiving the connection information packet from the downstream port thereof and parses the connection information of each control chip in the communication link;

When the control chip of the controller receives the connection information packet of the corresponding communication link from a certain downstream port thereof, the connection information packet can be parsed according to the corresponding protocol format, so as to extract the corresponding connection information of each port of the control chip of each lamp module in the communication link. Since the connection relationship of each port of two adjacent control chips is represented by the sequential relationship in the connection information packet, this connection relationship must be determined in the process of parsing the connection information packet.

step S3200: the control chip of the controller generating topological data that represents a signal transmission path constituted by each control chip in the communication link according to the sequential relationship of the connection information based on the identifier and the input/output type in the connection information of each control chip;

As mentioned above, the connection information corresponding to each lamp module comprises the identity of the port and the input/output type thereof. As such, in combination with the sequential relationship of each piece of connection information, the topological data corresponding to the signal transmission path composed of each control chip in the communication link can be generated.

The topological data can be represented by using a tree-like data structure, wherein the control chip of each lamp module is represented as a tree node, and the identity of the port of each control chip and the input/output type thereof are used as attribute data. According to the connection relationship between the ports of the control chips, the hierarchical relationship is established between the port of each current control chip and the port of the downstream control chip connected therewith, i.e., the connection relationship information of each lamp module in the communication link can be represented through the topological data.

The distribution of the light-emitting units arranged in each lamp module is known to the controller beforehand. As such, based on the topological data, the control chip of the controller, in combination with the distribution of the light-emitting units in the lamp module, can further enrich the topological data, and specify the information granularity of the position of each light-emitting unit in each lamp module, so as to facilitate carrying out finer granularity control of the lamp module according to the position of each light-emitting unit.

step S3300: the control chip of the controller obtaining lamp effect description information, converting the lamp effect description information into corresponding lamp effect control data according to the topological data, and sending the lamp effect control data to each control chip through the communication link to play a corresponding lamp effect.

After the controller generates the topological data, the topological data can be used to play lamp effects. The topological data have already represented the connection relationship information of each lamp module in the splicing lamp. Thus, for the lamp effect that needs to be played, the corresponding lamp effect description information is obtained and converted into the corresponding lamp effect control data in contrast to the topological data. As the lamp effect control data are transmitted downstream along the communication link, the control chip of each lamp module can read the control data corresponding thereto from the lamp effect control data according to the preset protocol format with the controller, so as to control the light emission of each light-emitting unit in the current lamp module. Each lamp module can read the control data corresponding thereto from the lamp effect control data to control the light emission according to this logic, so that each lamp module can read the control data corresponding thereto from the lamp effect control data to control the light emission, so that all the lamp modules can collaborate with each other to play the corresponding lamp effects.

The lamp effect description information can be data corresponding to lamp effect patterns played on the area array of the splicing lamp. As such, according to the lamp effect description information in combination with the position information of each light-emitting unit in the topological data determined beforehand, each area in a lamp effect image can be mapped to the corresponding light-emitting units, and converted into control data of each light-emitting unit, so as to generate the control data corresponding to each lamp module. By organizing the control data of each lamp module according to the connection relationship represented by the topological data, the lamp effect control data can be formed.

As can be seen from the above embodiment, the splicing lamp in the present application can serve for playing lamp effects after the controller thereof initiates the self-inspection, obtains the connection information packet, and generates the topological data. Since the control chip of the controller can accurately determine the connection relationship information of each lamp module, when a lamp effect needs to be played, the lamp effect image can also be accurately delivered. The lamp effect image is accurately mapped to the corresponding light-emitting units of each lamp module in the splicing lamp. Through the coordinated light emission of each light-emitting unit of each lamp module in the entire area array of the splicing lamp, the lamp effect is accurately presented.

Figure 4:
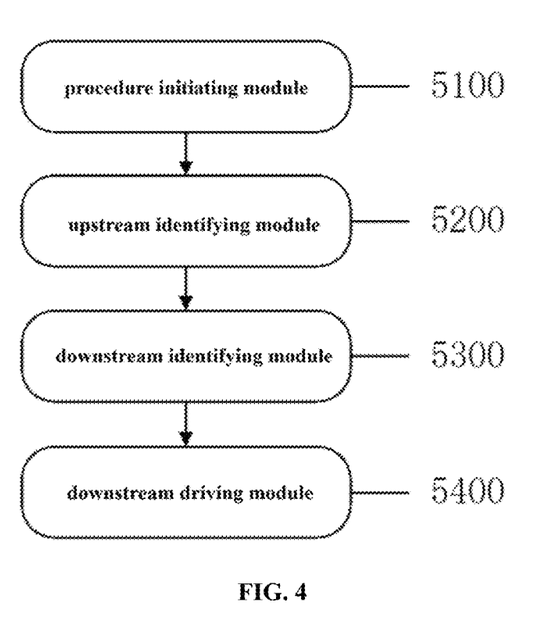
FIG. 4 is a structure diagram of a detection executing device in an embodiment of the present application.

As shown in FIG. 4, another embodiment of the present application further provides a detection executing device, which comprises a procedure initiating module 5100, an upstream identifying module 5200, a downstream identifying module 5300, and a downstream driving module 5400. Wherein, the procedure initiating module 5100 is arranged in such a way that a current control chip in a communication link configures all ports thereof to be in a strong pull-down mode, so as to initiate detection procedures as follows; the upstream identifying module 5200 is arranged in such a way that that the current control chip detects a level status of each port thereof, and when a port with a high level status is detected, the port is identified as an upstream port electrically connected with an upstream control chip in the communication link, and other ports are configured to be in a weak pull-up mode; the downstream identifying module 5300 is arranged in such a way that the current control chip detects the level status of each of the other ports, and when a port with a low level status is detected, the port is identified as a downstream port electrically connected with a downstream control chip in the communication link; the downstream driving module 5400 is arranged in such a way that the current control chip outputs a high level through the downstream port thereof, for driving the downstream control chip connected with the downstream port to execute the same detection procedures as the current control chip does.

On the basis of any embodiment of the detection executing device in the present application, the device further comprises: an end processing module, which is arranged in such a way: the current control chip intercepts and receives a connection information packet through each downstream port thereof; when the connection information packet is not received within a first duration, the current control chip encapsulates connection information of its own into a connection information packet and submits the connection information packet through an upstream port thereof to the upstream control chip connected with the upstream port, wherein the connection information comprises an identity of each port of the control chip, to which it belongs, and input/output type thereof; an intermediate processing module, which is arranged in such a way: when the current control chip receives a connection information packet submitted by a downstream control chip connected with a downstream port thereof through the downstream port within the first duration, the current control chip adds the connection information of its own to the connection information packet according to a sequential relationship thereof in the communication link, and submits the connection information packet to the upstream control chip through the upstream port thereof.

Figure 5:
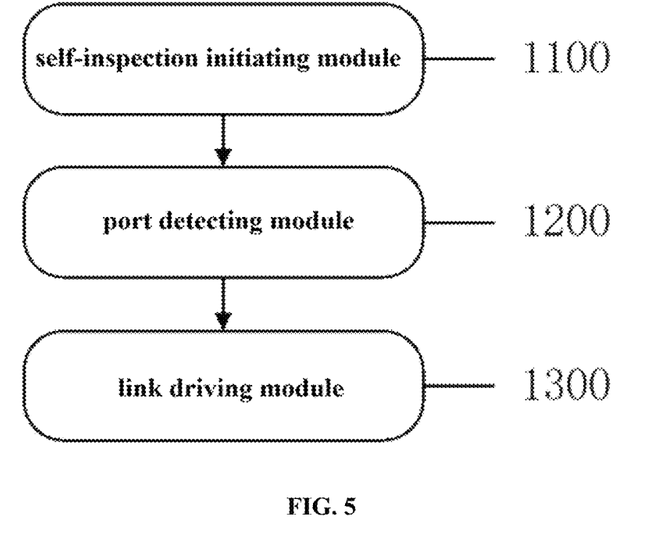
FIG. 5 is a structure diagram of a detection driving device in an embodiment of the present application.

As shown in FIG. 5, another embodiment of the present application further provides a detection executing device, which comprises a self-inspection initiating module 1100, a port detecting module 1200, and a link driving module 1300. Wherein, the self-inspection initiating module 1100 is arranged in such a way that a control chip of a controller initiates a self-inspection mode and configures all ports thereof to be in a weak pull-up mode; the port detecting module 1200 is arranged in such a way: the control chip of the controller detects a level status of each port; when a port with a low level status is detected, the port is identified as a downstream port electrically connected with a downstream control chip in a communication link; the link driving module 1300 is arranged in such a way that the control chip of the controller outputs a high level to the downstream port, so that the downstream control chip connected with the downstream port executes the detection procedures in the detection executing method.

On the basis of any embodiment of the detection driving device in the present application, the device further comprises: a normal handling module, which is arranged in such a way that the control chip of the controller starts a timer and waits within a second duration for a connection information packet, which comprises connection information of each control chip arranged according to a sequential relationship in the communication link, wherein the connection information comprises an identity of each port of the control chip, to which it belongs, and input/output type thereof; an exception handling module, which is arranged in such a way that when the connection information packet is still not received after the second duration expires, the control chip of the controller exits the self-inspection mode and outputs alarm information.

On the basis of any embodiment of the detection driving device in the present application, the device further comprises: an information parsing module, which is arranged in such a way that the control chip of the controller receives the connection information packet from the downstream port thereof and parses the connection information of each control chip in the communication link; a topology generating module, which is arranged in such a way that the control chip of the controller generates topological data that represent a signal transmission path constituted by each control chip in the communication link according to the sequential relationship of the connection information based on the identifier and the input/output type in the connection information of each control chip; a lamp effect play module, which is arranged in such a way that the control chip of the controller obtains lamp effect description information, converts the lamp effect description information into corresponding lamp effect control data according to the topological data, and sends the lamp effect control data to each control chip through the communication link to play a corresponding lamp effect.

Figure 6:
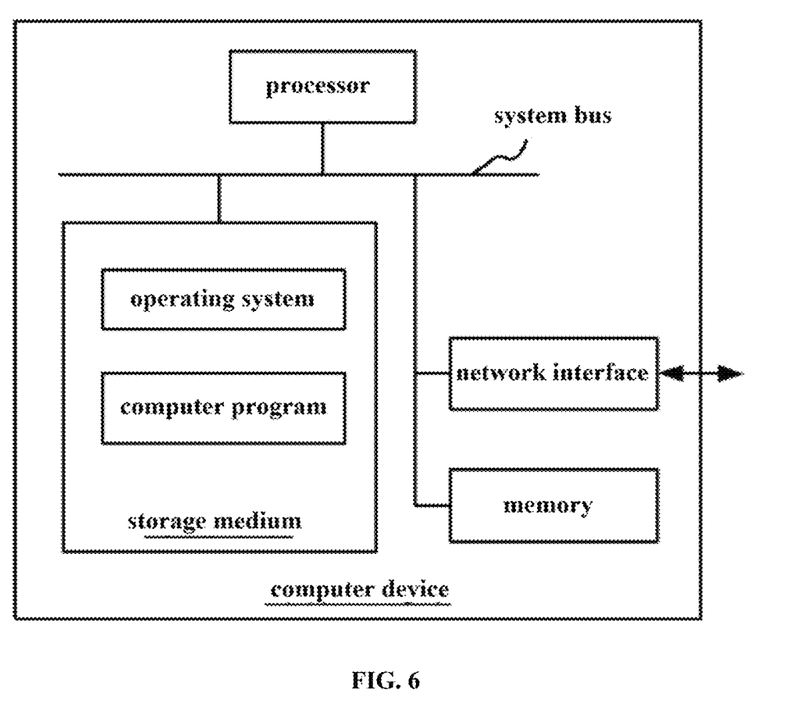
FIG. 6 is a structure diagram of a computer device in an embodiment of the present application.

On the basis of any embodiment of the present application, as shown in FIG. 6, another embodiment of the present application further provides a computer device. FIG. 6 is an internal structure diagram of the computer device. The computer device comprises a processor, a computer-readable storage medium, a memory, and a network interface, which are connected via a system bus. Wherein, an operating system, a database, and computer-readable instructions are stored in the computer-readable storage medium of the computer device, control information sequences can be stored in the database, and when the computer-readable instructions are executed by the processor, the processor can implement a detection executing method or a detection driving method. The processor of the computer device is used to provide computing and control capabilities, in support of the operation of the entire computer device. A computer-readable instruction can be stored in the memory of the computer device. When executed by the processor, the computer-readable instruction can make the processor execute the detection executing method or detection driving method in the present application. The network interface of the computer device is used to connect and communicate with a terminal. Persons skilled in the art can understand that the structure shown in FIG. 6 is only a block diagram of some structures relevant to the solution of the present application, and does not impose limitations on the computer device, to which the solution of the present application is applied. The specific computer device can comprise more or fewer components than those shown in the figure, or be combined with certain components, or have different component arrangements.

In the present manner of implementation, the processor is used to execute the specific functions of various modules and sub-modules thereof in FIG. 4 or FIG. 5, and program codes and various kinds of data required to execute the above modules or sub-modules are stored in the memory. The network interfaces are used for data transmission between user terminals and servers. The program codes and data required to execute all the modules/sub-modules in the detection executing device or detection driving device of the present application are stored in the memory in the present manner of implementation. A server can call program codes and data of the server to execute the functions of all the sub-modules.

The present application also provides a storage medium, in which computer-readable instructions are stored; when executed by one or more processors, the computer-readable instructions make one or more processors execute the steps in the detection executing method or detection driving method described in any embodiment of the present application.

The present application further provides a computer program product, comprising a computer program/instruction; when executed by one or more processors, the computer program/instruction implements the steps in the detection executing method or detection driving method described in any embodiment of the present application.

Persons skilled in the art can understand that all or some of the procedures in the above embodiment method of the present application can be implemented by instructing relevant hardware through a computer program, which can be stored in a computer-readable storage medium. When executed, the program can comprise the procedures in the embodiments of the above methods. Wherein, the storage medium can be a computer-readable storage medium, such as a magnetic disk, an optical disk, and Read-Only Memory (ROM), or Random Access Memory (RAM).

The above is only partial embodiments of the present disclosure. It should be pointed out that for those of ordinary skill in the art, several improvements and modifications can be made without departing from the principle of the present disclosure, and the improvements and modifications should also be regarded within the scope of the present disclosure.

Accordingly, the present disclosure breaks through the barriers caused by the data complexity formed by the splicing-lamps at the hardware level and the parameter level, and provides users with a more convenient lighting-effect preview solution, thereby guiding users to accurately generate the lighting-effect application package of the target splicing-lamps, thereby improving the efficiency of editing lighting effects by the users and improving the data security of the information presented by the corresponding lighting effects.

What is claimed is:

1. A detection executing method, comprising:
   a current control chip in a communication link configuring all ports of the current control chip to be in a strong pull-down mode, and initiating detection procedures including:
   the current control chip detecting a level status of each port of the current control chip, and when detecting a port with a high level status, identifying the port with the high level status as an upstream port electrically connected with an upstream control chip in the communication link, and configuring other ports of all ports of the current control chip except the upstream port to be in a weak pull-up mode;

the current control chip detecting the level status of each of the other ports, and when detecting a port with a low level status, identifying the port with the low level status as a downstream port electrically connected with a downstream control chip in the communication link;

the current control chip outputting a high level through the downstream port, for driving the downstream control chip connected with the downstream port to execute the detection procedures.

2. The detection executing method according to claim 1, wherein after the current control chip outputting a high level through the downstream port, the detection executing method further comprises:

the current control chip intercepting and receiving a connection information packet through each downstream port thereof, and when the connection information packet is not received within a first duration, the current control chip encapsulating connection information of its own into a connection information packet and submitting the connection information packet through an upstream port thereof to an upstream control chip connected with the upstream port, wherein the connection information comprises an identity of each port of the control chip, to which it belongs, and input/output type thereof;

when the current control chip receives a connection information packet submitted by a downstream control chip connected with a downstream port thereof through the downstream port within the first duration, the current control chip adding the connection information of its own to the connection information packet according to a sequential relationship thereof in the communication link, and submitting the connection information packet to the upstream control chip through the upstream port thereof.

3. A detection driving method, comprising:

a control chip of a controller initiating a self-inspection mode and configuring all ports of the control chip to be in a weak pull-up mode;

the control chip of the controller detecting a level status of each port, and when detecting a port with a low level status, identifying the port as a downstream port electrically connected with a downstream control chip in a communication link;

the control chip of the controller outputting a high level to the downstream port, so that the downstream control chip connected with the downstream port executes the detection procedures according to claim 1.

4. The detection driving method according to claim 3, wherein after the control chip of the controller initiating a self-inspection mode, the detection driving method comprises:

the control chip of the controller starting a timer and waiting within a second duration for a connection information packet, which comprises connection information of each control chip arranged according to a sequential relationship in the communication link, wherein the connection information comprises an identity of each port of the control chip and input/output type of each port of the control chip;

the control chip of the controller exiting the self-inspection mode and outputting alarm information when the connection information packet is still not received after the second duration expires.

5. The detection driving method according to claim 4, wherein after the control chip of the controller starting a timer and waiting within a second duration for a connection information packet, the detection driving method comprises:

the control chip of the controller receiving the connection information packet from the downstream port thereof and parses the connection information of each control chip in the communication link;

the control chip of the controller generating topological data that represents a signal transmission path constituted by each control chip in the communication link according to the sequential relationship of the connection information based on the identifier and the input/output type in the connection information of each control chip;

the control chip of the controller obtaining lamp effect description information, converting the lamp effect description information into corresponding lamp effect control data according to the topological data, and sending the lamp effect control data to each control chip through the communication link to play corresponding lamp effects.

6. A splicing lamp, comprising a controller and at least one lamp module, wherein:

the at least one lamp module is in communication connection with the controller through a communication link; and the lamp module comprises a control chip and multiple light-emitting units controlled by the control chip, wherein the control chip is configured to serve as a current control chip and to perform:

configuring all ports of the current control chip to be in a strong pull-down mode, and initiating detection procedures including:

detecting a level status of each port of the current control chip, and when detecting a port with a high level status, identifying the port with the high level status as an upstream port electrically connected with an upstream control chip in the communication link, and configuring other ports of all ports of the current control chip except the upstream port to be in a weak pull-up mode;

detecting the level status of each of the other ports, and when detecting a port with a low level status, identifying the port with the low level status as a downstream port electrically connected with a downstream control chip in the communication link;

outputting a high level through the downstream port, for driving the downstream control chip connected with the downstream port to execute the detection procedures.

7. The splicing lamp according to claim 6, wherein the controller comprises a control chip, wherein the control chip of the controller is configured to perform:

initiating a self-inspection mode and configuring all ports of the control chip of the controller to be in a weak pull-up mode;

detecting a level status of each port of all ports of the control chip of the controller, when detecting a port with a low level status, identifying the port as a downstream port electrically connected with a downstream control chip in a communication link;

outputting a high level to the downstream port, so that the downstream control chip connected with the downstream port executes the detection procedures.

* * * * *